United States Patent
Vasicek et al.

(12) 
(10) Patent No.: US 10,206,419 B2
(45) Date of Patent: Feb. 19, 2019

(54) HONEY INFUSED WITH POLLEN

(71) Applicants: Jean Marie Vasicek, Orlando, FL (US); Gerald Scott Shurman, Orlando, FL (US)

(72) Inventors: Jean Marie Vasicek, Orlando, FL (US); Gerald Scott Shurman, Orlando, FL (US)

( * ) Notice: Subject to any disclaimer, the term of this patent is extended or adjusted under 35 U.S.C. 154(b) by 310 days.

(21) Appl. No.: 15/145,544

(22) Filed: May 3, 2016

(65) Prior Publication Data

US 2017/0318846 A1    Nov. 9, 2017

(51) Int. Cl.
*A23L 21/25* (2016.01)
*A23L 21/20* (2016.01)

(52) U.S. Cl.
CPC ............ *A23L 21/25* (2016.08); *A23L 21/20* (2016.08); *A23L 21/27* (2016.08); *A23V 2002/00* (2013.01)

(58) Field of Classification Search
CPC ............. A23L 21/25; A23L 21/27; A23L 1/06
USPC .......................................................... 426/658
See application file for complete search history.

(56) References Cited

U.S. PATENT DOCUMENTS

| | | | | |
|---|---|---|---|---|
| 4,504,516 A * | 3/1985 | Schanze | .................. | A23L 21/25 426/443 |
| 4,529,612 A * | 7/1985 | Robson | .................. | A23L 21/25 426/641 |
| 4,540,594 A * | 9/1985 | Schanze | .................. | A23L 33/16 426/613 |
| 4,588,134 A * | 5/1986 | Shimizu | .................. | A23L 21/20 241/21 |
| 5,692,685 A * | 12/1997 | Ochiai | .................... | B02C 17/08 241/21 |
| 6,171,604 B1 * | 1/2001 | Mousa | .................. | A61K 8/988 424/401 |

FOREIGN PATENT DOCUMENTS

JP         401317361 A  * 12/1989

* cited by examiner

*Primary Examiner* — Nina Bhat

(57) ABSTRACT

Honey infused with pollen is a method of infusing pure raw minimally processed honey with minimally processed plant and bee pollen.

3 Claims, No Drawings

HONEY INFUSED WITH POLLEN

FIELD OF THE INVENTION

Not Applicable

DESCRIPTION OF RELATED ART INCLUDING INFORMATION DISCLOSED UNDER 37 CFR 1.97 and 1.98

Not Applicable

BRIEF SUMMARY OF THE INVENTION

The comprehensive result of the present invention contains raw honey, bee pollen, and/or manually collected pollen. The pollens are frozen to prevent spoilage. Upon collecting all of the desired pollens, the pollens are mixed together and thoroughly blended with raw honey to create a product, with extended shelf life, containing a known variety of pollens.

BRIEF DESCRIPTION OF THE SEVERAL VIEWS OF THE DRAWING(S)

No drawings.

DETAILED DESCRIPTION OF THE INVENTION

The method for creating a product with extended shelf life containing desired amounts and varieties of pollen described below. Pollens not necessarily collected by bees such as tree, grass and shrub pollen may be required in the product. If so, these pollens can be collected manually as described below. Other pollens that are collected by bees may be desired. Methods for collecting bee pollen are described below.

Method for Manual Collection of Pollen:

If a desired tree or grass pollen that is not necessarily collected by bees is required, the manual collection process can be used to obtain the pollen. If targeting a pollen mixture to help with allergy relief, pollens from pine, oak, cedar, juniper and ragweed should be targeted along with any other specific pollen desired. If targeting allergies, pollen should be collected from all seasons from as many allergy causing pollen sources as possible. Manual collection is achieved by shaking the pollen from desired pollen producing plants into resealable bags. Pour pollen into an airtight bag marked with the pollen type, moisture* content and collection date. Remove as much air from bag as possible. Store in airtight container in the freezer and kept at a temperature below 32 degrees Fahrenheit. A Dyson DC 35 Multi Floor vacuum can be used to suck lighter pollens from plants.

Method for Collecting Bee Pollen:

Collect bee pollen using a pollen trap on a beehive. (The most effective pollen traps are the Sundance pollen trap.) Position beehives in all areas from which bee pollen is desired. Turn pollen trap on for a 2-3 hours, collecting pollen immediately upon turning trap off to prevent spoilage. To prevent damaging/destroying beehive, collect pollen weekly to ensure that the hive retains enough pollen to remain healthy (or collect from multiple hives such that one hive is not continually deprived of pollen). Pour pollen into an airtight bag marked with the most likely pollen type, moisture* content and collection date. Remove as much air from bag as possible. The pollen should be stored in an airtight container in a freezer and kept at a temperature below 32 degrees Fahrenheit.

The moisture content of the pollen is only an issue if the infused honey is required to have a large amount of wet pollen mixed with a high moisture honey. An equation to calculate resulting moisture content of the infused honey as a function of the required percentage of pollen, the moisture content of the pollen, and the moisture content of the honey prior to infusion is given below $$ihm = (pm*pp+hm)/(pp+1)+hm \text{ where}$$

ihm is the percent infused honey moisture
pm is the percent pollen moisture
pp is the percent pollen
hm is the percent honey moisture Typically pollen measures between 4% and 10%.[1] Moisture content of honey ranges from about 13% to 25%. If large amounts of pollen are to be infused into honey, the moisture of the honey to be infused should be as low as possible. The moisture content of orange blossom honey is typically between 15% and 16%. Honeys produced in desert areas such as New Mexico wildflowers can have moisture contents as low as 13%. After the desired quantity and variety of pollen has been collected and a low moisture honey has been created by bees, a product containing a mixture of pollens with a nearly infinite shelf life can be created.

The Following Describes in Detail the Method for Creating a Product Targeting Allergy Relief:

(a) After the desired quantity and variety of pollen has been collected throughout the year, a product containing a mixture of pollens can be created by warming a convenient amount of raw unprocessed honey to between 90-97 degrees Fahrenheit. (i.e. the same temperature that bees typically maintain their hive temperature which ranges from about 90-97 degrees Fahrenheit). In a blender, combine the known amount of warm honey with an amount of frozen pollen equal to about 2-3% of the total weight of warmed honey. Record the pollen weight. Use a single pollen type or multiple varieties depending on the desired pollen mixture. If a variety of pollen is required, measure desired amounts of each individual pollen into mixing bowl, stir the mixture that the variety of pollens are evenly distributed. Blend the pollen and warmed honey on high cycle until mixture becomes frothy.

(b) Using the pollen weight recorded in step (a) calculate how much additional honey must be added to the pollen such that the ratio of pollen to honey is between 0.017% and 0.025%. Warm the calculated amount of honey to between 90-97 degrees Fahrenheit. The ratio of pollen to honey (by weight) should be between 0.017% and 0.025%. The raw, unfiltered, unprocessed honey will act as a preservative for the pollen yielding a product with a storage life of several years without requiring refrigeration. For optimum shelf life, a honey with moisture content less than 17% should be used such that fermentation will not occur. Use a honey with moisture content less than 18.4% to maintain USDA grade A standards.

(c) Stir honey and the pollen mixture until ingredients are evenly distributed. Bottle the product and close with an airtight seal to prevent moisture from entering container. During the bottling process, the honey must be stirred every twenty minutes so that the distribution of the pollen particles remains consistent.

The Following Describes in Detail how to Create a Product Targeting a Nutritional Supplement:
(a) After the desired quantity and variety of pollens have been collected, mix pollens together making a note of the weight and moisture content of all pollens added. Calculate the total percent moisture of the pollen mixture. Calculate the total weight of the pollen mixture.
(b) Measure the moisture content of the raw unprocessed unfiltered honey that will be used for preserving the pollen. Calculate the amount of honey that should be added to the pollen to maintain an overall moisture level below 18.6% to meet the USDA standard for grade A and minimize the risk of fermentation or below 17.1% to reduce the risk of fermentation to nearly zero.
(c) Warm the amount of honey calculated in step (b) to a temperature between 90-97 degrees Fahrenheit. Stir honey every 20 minutes while warming to prevent burning the honey. Honey can be warmed with a temperature controlled warming band or in a refrigerator that has been modified to produce heat instead of cold.
(d) Blend a convenient amount of the warmed honey with a convenient amount of the pollen mixture from step (c). Use enough honey such that the pollen is completely immersed and blender can easily mix contents into a frothy substance.
(e) Repeat step (d) until all of the pollen has been blended into honey.
(f) Mix all of the frothy pollen/honey mixtures into the warmed honey.
(g) Store product in airtight containers.

What is claimed:

1. A method of making a honey mixed with pollen having extended shelf life comprising:
   (a) collecting plant based pollen from plants, trees, or shrubs and storing in an air tight container;
   (b) measuring and recording the date of collection, location and plant based pollen source when collecting said plant based pollen and subsequently freezing said plant based pollen at a temperature below 32° F.;
   (c) collecting bee pollen with a pollen trap on a bee hive and measuring and recording the moisture, date of collection and temperature of said bee pollen and subsequently freezing said bee pollen at a temperature below 32° F. and storing in an air-tight container;
   (d) mixing the plant pollen and bee pollen in a desired amount;
   (e) mixing the pollens from step (d) with a desired amount of warmed honey and storing said honey pollen mixture in an air-tight container.

2. A method of making a honey mixed with pollen having extended shelf life comprising:
   (a) collecting plant based pollen throughout the year in a plurality of locals wherein said plant based pollen is selected from the group consisting of pine, oak, cedar, juniper, ragweed and mixtures thereof;
   (b) measuring and recording the date of collection, and local of said plant based pollen source and subsequently freezing the pollen at a temperature below 32° F.;
   (c) collecting bee pollen with pollen traps on bee hives located in a plurality of locals, measuring and recording the date of collection, location and pollen source when collecting the pollen and subsequently freezing the pollen at a temperature below 32° F. and storing in air-tight containers;
   (d) mixing the plant pollen and bee pollen in a desired amount;
   (e) blending a measured amount of pollens from step (d) with a measured amount of raw unfiltered honey warmed to a temperature of 90-97° F. in a blender until the mixture is frothy;
   (f) adding blended mixture from step (e) to a larger quantity of raw unfiltered honey heated to a temperature of 90-97° F. wherein the ratio of pollen to honey (by weight) is between 0.017% and 0.025% and maintaining an overall moisture content of the honey pollen mixture to less than 17%;
   (g) stirring said honey pollen mixture of step (f) until the mixture of honey, plant pollen and bee pollen is evenly distributed;
   (h) bottling the honey pollen mixture in an airtight container while stirring to ensure a consistent distribution of pollen.

3. A method of making a honey mixed with pollen having extended shelf life comprising:
   (a) collecting plant based pollen throughout the year in multiple locals selected from the group consisting of pine, oak, cedar, juniper, ragweed and mixtures thereof;
   (b) measuring and recording the date of collection, and plant based pollen source local and freezing said plant based pollen at a temperature below 32° F.;
   (c) collecting bee pollen with pollen traps on bee hives in multiple locals, measuring and recording the date of collection, type of bee pollen and local, and subsequently freezing said bee pollen at a temperature below 32° F. and storing in air-tight containers;
   (d) mixing the plant based pollen and bee pollen in a desired amount;
   (e) warming 3 pounds of raw unprocessed honey to a temperature between 90-97° F.
   (f) combining said 3 pounds of warm honey from step (e) with approximately 33 grams of frozen pollen selected from plant based pollen, bee pollen or mixtures thereof;
   (g) blending the mixture of step (f) in a blender until the mixture becomes frothy;
   (h) mixing said blended ingredients from step (g) with approximately 350 pounds of warmed raw, unprocessed, unfiltered honey and maintaining an overall moisture content of the honey pollen mixture of less than 17%;
   (i) stirring said mixture from step (h) until the pollen is evenly distributed in said honey;
   (j) bottling said mixture in airtight containers while stirring said mixture every twenty minutes to distribute the pollen particles in the honey.

* * * * *